ALVAR GEORGE CARLTON
JAMES W. FOLLIN, JR
INVENTORS

Nov. 12, 1963  A. G. CARLTON ETAL  3,110,896
RADAR TRACKING LOOP
Filed April 15, 1957  3 Sheets-Sheet 3

TIME SCALE: 1 DIVISION = 1 SECOND

ALVAR GEORGE CARLTON
JAMES W. FOLLIN, JR.
INVENTORS

BY
ATTORNEYS

United States Patent Office 3,110,896
Patented Nov. 12, 1963

3,110,896
RADAR TRACKING LOOP
Alvar George Carlton and James W. Follin, Jr., Silver Spring, Md., assignors to the United States of America as represented by the Secretary of the Navy
Filed Apr. 15, 1957, Ser. No. 653,043
4 Claims. (Cl. 343—7.4)

This invention relates to improvements in automatic tracking radars. In more detail, the invention relates to a servomechanism for automatically adjusting the response of the tracking loop of an automatic tracking radar in order to reduce the target miss angle of a beam riding guided missile.

In one form of guidance system, a missile is guided to intercept a target by being constrained to ride the axis of a radar beam which is tracking the target. A radar having an automatic tracking loop provides the beam.

An automatic tracking loop of this type is described in Vol. 25 of the Massachusetts Institute of Technology Radiation Laboratory Series (1947), entitled "Theory of Servo Mechanisms," at page 212 and following. As can be seen in this publication, an automatic tracking loop includes a radar transmitter and receiver for transmitting and receiving a conically-scanned radar beam. The receiver also includes means for providing both train and elevation error signals which are then supplied to a suitable apparatus for positioning the radar dish to eliminate the angular error in tracking the target.

It has been found that an important requirement for proper missile beam riding is that the response of the automatic tracking loop vary according to the target noise and the target maneuver encountered; that is, the response of the radar should be "tight" when tracking a maneuvering target, thereby reducing lag and increasing "jitter," while with a non-maneuvering target the radar should be "soft," reducing "jitter."

Accordingly, it is the primary object of this invention to provide an automatic tracking loop including means for continuously varying the response of said tracking loop in accordance with target noise and target maneuver.

Still another object of this invention is to provide a servomechanism for automatically adjusting the response of the tracking loop of an automatic tracking radar in order to reduce the target miss angle of a beam riding guided missile.

Figure 1:
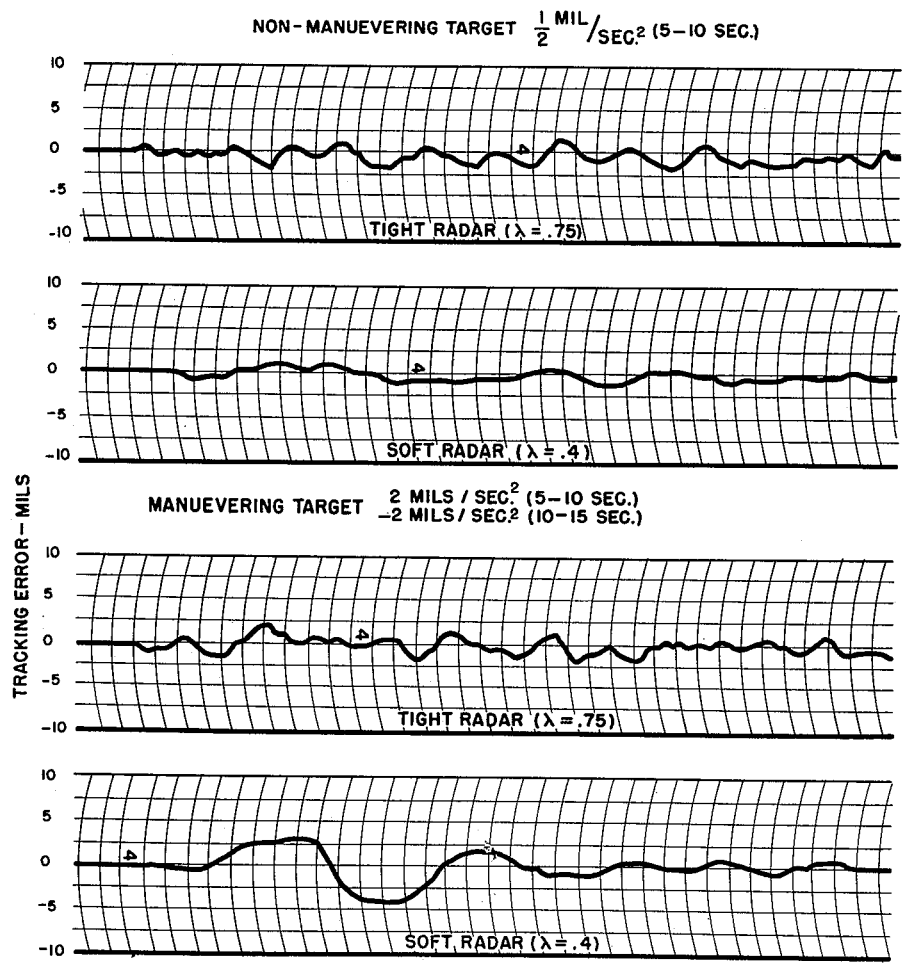
Figure 2:
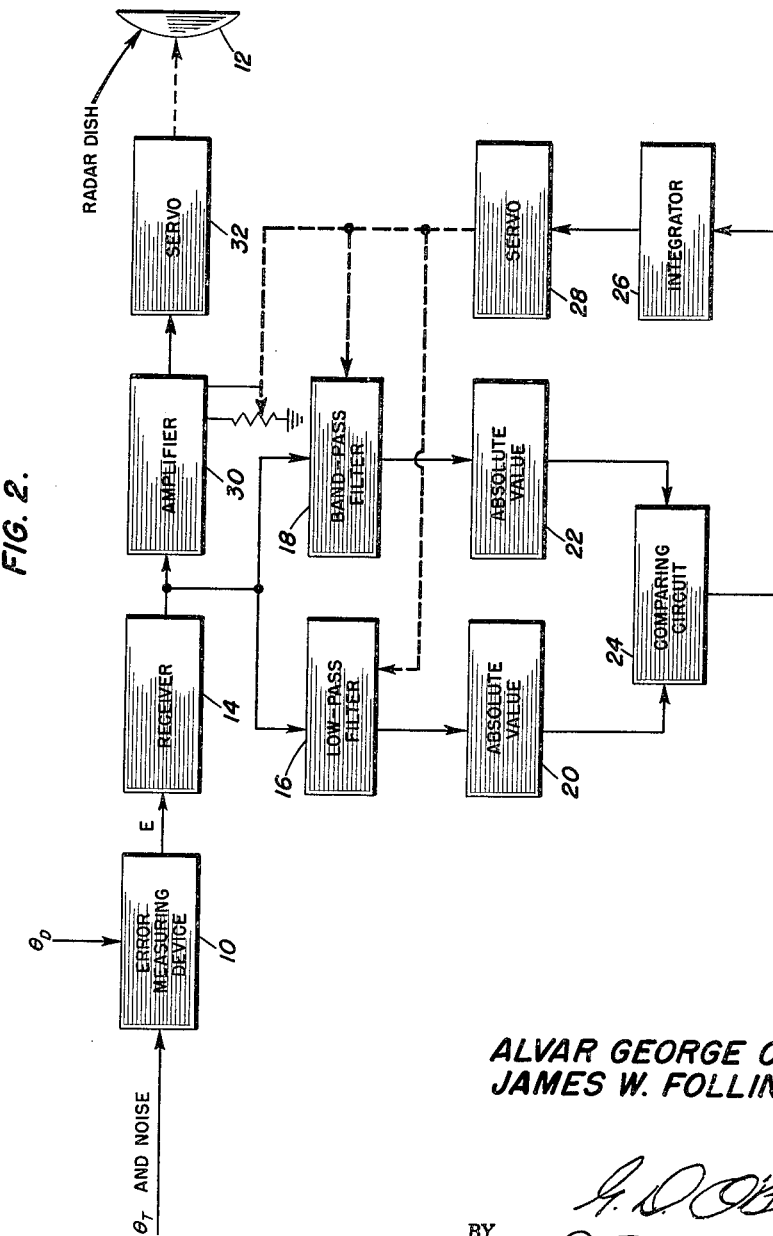
Figure 3:
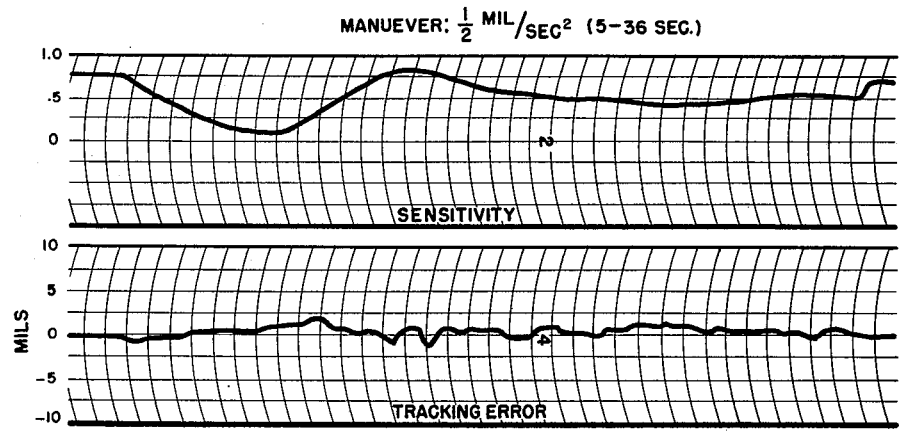
Figure 3:
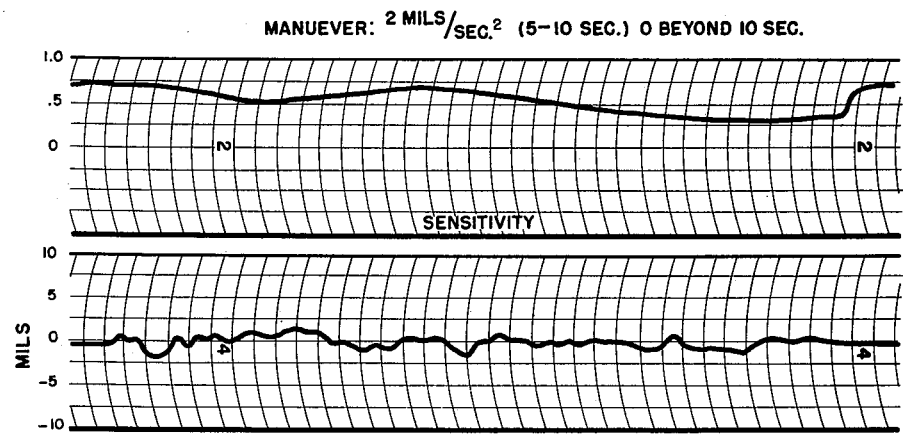

These and other objects of this invention will be apparent from the following detailed description and claims, taken in conjunction with the accompanying drawings in which:

FIG. 1 consists of curves showing the performance of a prior art radar tracking loop;

FIG. 2 is a block diagram of the tracking loop of an automatic tracking radar comprising the present invention; and FIG. 3 consists of curves showing the performance of the radar tracking loop of FIG. 2.

Briefly, the present invention resides in providing, in the automatic tracking loop, a servomechanism which includes a low-pass filter and a high-pass filter to provide a measure of tracking radar lag due to target maneuver, and target noise, respectively. The absolute values of the outputs of the two filters are determined and the difference between the absolute values is used to adjust the response of the radar tracking loop.

More specifically, an automatic tracking loop is provided for a tracking radar for positioning its radar dish. This tracking loop includes means for providing a voltage which is representative of the error between the pointing direction of the radar dish and the direction of the target. This error voltage is applied to an amplifier. Additional means is electrically associated with the amplifier for selectively adjusting the response characteristics of the amplifier depending upon the degree of maneuver of a target.

A servomechanism is associated with the amplifier and the output signal therefrom is supplied to this servomechanism. This servomechanism is adapted to position the radar dish to eliminate the error voltage.

Referring now to FIG. 1, it will be seen that for a non-maneuvering target, a "tight" radar, that is, one having a high gain and consequently a short time constant, causes the tracking error in mils to be greater than the tracking error for a "soft" radar, having a lower gain and consequently relatively longer time constant. This is because the "tight" radar will follow so-called target noise due to propeller reflection and radar servo noise, while the "soft" radar does not follow such noise because of its low gain and long time constant. On the other hand, it will be seen that, for a maneuvering target, the tracking error of the "tight" radar is considerably less than that of the "soft" radar, thereby reducing the lag of the radar in tracking the target.

This invention, including the means for adjusting the response of the tracking loop to minimize the tracking error, is shown in FIG. 2 as comprising an error measuring device 10. Data in the form of voltages representing the pointing direction of a radar dish 12, expressed as an angle $\theta_D$, and the target direction, expressed as an angle $\theta_T$ and noise, provide the inputs to the error measuring device 10.

The output of the error measuring device 10 is a voltage E, representing the pointing error of a radar dish 12, which is supplied to a receiver 14. The receiver 14 provides separate train and elevation error signals which, in the case of prior automatic tracking systems, were fed directly to corresponding amplifiers 30 and servos 32 to position the dish 12 in order to eliminate the tracking error. For the sake of simplicity, FIG. 2 shows only so much of the system as is needed for control of error in train. It is understood that the system following receiver 14 would be duplicated to provide for correction of error in elevation.

In the case of the present invention, the error signals, together with noise, are also supplied to a low-pass filter 16 and a band-pass filter 18, which are designed to pass the components of the error signals that are due to target maneuver and to target noise, respectively. Voltages representing the absolute values of the outputs of the low-pass filter 16 and the band-pass filter 18 are provided by suitable circuits 20 and 22, respectively. The circuits 20 and 22 may suitably comprise absolute value circuits of the linear full wave rectifier type illustrated at page 427 of the book "Electronic Analog Computers" by Korn and Korn, McGraw-Hill, 1956.

The magnitudes of the absolute values of the outputs of the low-pass filter 16 and the band-pass filter 18 indicate whether a "tight" or "soft" radar is desired. To determine which of the voltages is the greater, they are fed to a comparing circuit 24. Any difference in these absolute values is supplied through a suitable integrator 26 to a servo 28 which increases the gain of amplifier 30 in the case of a preponderance of output from low pass filter 16 and reduces the gain of amplifier 30 in the case of a preponderance of output from band pass filter 18. This gain change may be accomplished by having the servo 28 operate suitable potentiometers in the amplifier 30 in the tracking loop to change the gain and time constant of said amplifier. The gain of amplifier 30 is thus adjusted according to the frequency characteristic of the received error signal.

The servo 28 is also mechanically connected to the filters 16 and 18 for changing the pass band of filters. In this manner, the filters 16 and 18 scan the frequency spectrum of the error signal, and the tracking loop gain is adjusted in a manner dependent on the spectral density of the error signal, as has been found desirable.

The error signals from the receiver 14 are also supplied to a pair of amplifiers 30, only one of which is shown, whose response characteristics are adjusted in the aforesaid manner. The output of the amplifier 30, thus modified, is supplied to a servo 32 which adjusts the position of dish 12 either in train or elevation to eliminate the tracking error.

The improvement in the performance of the tracking loop of the present invention is shown in FIG. 3. In the upper curve, the sensitivity of the loop is shown as dropping from an initial value and, in the next lower curve, an increasingly low tracking error is shown, until the target begins to maneuver. At this time, the sensitivity of the tracking loop is increased by adjusting the amplifier 30 in the aforesaid manner and the tracking error similarly passes through its maximum at the time of target maneuver. Both sensitivity and tracking error then settle down to a desirable value for a maneuvering target.

In the lower set of curves in FIG. 3, the records of performance are shown of a system following a target making a strong maneuver. The tracking loop responds to a strong maneuver with little tracking error and the sensitivity of the loop remains high for a relatively long time after the maneuver ceases.

Obviously many modifications and variations of the present invention are possible in the light of the above teachings. It is, therefore, to be understood that within the scope of the appended claims the invention may be practiced otherwise than as specifically described.

What is claimed is:

1. An automatic tracking loop for positioning a radar dish comprising, means for providing a voltage representing the error between the pointing direction of the radar dish and the direction of a target, an amplifier to which said error voltage is supplied, frequency responsive means independent from said amplifier for detecting the frequency characteristic of said error voltage and for selectively adjusting the gain of said amplifier in response to said frequency characteristic and a servomechanism to which the output of said amplifier is supplied, said servomechanism being adapted to position said radar dish to eliminate said error voltage.

2. An automatic tracking loop for positioning a radar dish comprising, means for providing a voltage representing the error between the pointing direction of the radar dish and the direction of a target, an amplifier to which said error voltage is supplied, a low pass filter and a band pass filter to which said voltage is also supplied, means for determining the difference between the outputs of said filters, a first servomechanism to which said difference is supplied arranged to adjust a gain controlling potentiometer in said amplifier, and a second servomechanism to which the output of said amplifier is supplied, said servomechanism being adapted to position said radar dish to eliminate said error voltage.

3. An automatic tracking loop as defined in claim 2 and further comprising an integrator means connected between the output of said means for determining the difference voltage between the outputs of said filters and said first servomechanism for receiving and integrating said difference voltage.

4. An automatic tracking loop as defined in claim 3 wherein said first servomechanism is also mechanically connected to both of said filters for changing the pass band of said filters, thereby causing the filters to scan the frequency spectrum of the error signal.

References Cited in the file of this patent
UNITED STATES PATENTS

| | | |
|---|---|---|
| 2,647,258 | McCoy | July 28, 1953 |
| 2,698,932 | Wathen | Jan. 4, 1955 |
| 2,760,131 | Braunagel | Aug. 21, 1957 |